US007616808B2

(12) United States Patent
Toshihiro

(10) Patent No.: US 7,616,808 B2
(45) Date of Patent: Nov. 10, 2009

(54) PHOTOGRAPH IMAGE-PROCESSING METHOD AND DEVICE THEREOF

(75) Inventor: Shunsaku Toshihiro, Wakayama Prefecture (JP)

(73) Assignee: Noritsu Koki Co., Ltd., Wakayama (JP)

( * ) Notice: Subject to any disclaimer, the term of this patent is extended or adjusted under 35 U.S.C. 154(b) by 654 days.

(21) Appl. No.: 11/285,362

(22) Filed: Nov. 23, 2005

(65) Prior Publication Data

US 2006/0110033 A1    May 25, 2006

(30) Foreign Application Priority Data

Nov. 24, 2004    (JP)    ............................. 2004-338727

(51) Int. Cl.
*G06K 9/00*    (2006.01)
(52) U.S. Cl. ...................... 382/162; 382/168
(58) Field of Classification Search ................ 382/167, 382/168, 162; 358/98, 80
See application file for complete search history.

(56) References Cited

U.S. PATENT DOCUMENTS

| 4,805,016 | A | | 2/1989 | Kato | |
|---|---|---|---|---|---|
| 5,014,123 | A | * | 5/1991 | Imoto | ......................... 358/506 |
| 6,204,940 | B1 | * | 3/2001 | Lin et al. | ..................... 358/527 |
| 6,600,548 | B2 | * | 7/2003 | Enomoto | ...................... 355/40 |
| 6,621,923 | B1 | * | 9/2003 | Gennetten | ................... 382/162 |
| 6,646,760 | B1 | * | 11/2003 | Hanihara | ..................... 358/1.9 |
| 6,775,408 | B1 | * | 8/2004 | Masaki | ........................ 382/167 |
| 6,834,127 | B1 | * | 12/2004 | Yamamoto | .................. 382/282 |
| 2002/0196472 | A1 | * | 12/2002 | Enomoto | ................... 358/3.26 |
| 2003/0002059 | A1 | | 1/2003 | Zaklika et al. | |
| 2004/0190789 | A1 | * | 9/2004 | Liu et al. | ..................... 382/274 |
| 2004/0197022 | A1 | | 10/2004 | Gonsalves | |

FOREIGN PATENT DOCUMENTS

JP    2000-330221 A    11/2000

OTHER PUBLICATIONS

Chen, et al, "Automatic Histogram Specification Based onFuzzy Set Operations for Image Enhancement" IEEE Signal Processing Letters, vol. 2. No. 2, Feb. 1995, pp. 37-40.*

* cited by examiner

*Primary Examiner*—Samir A. Ahmed
*Assistant Examiner*—Mekonen Bekele
(74) *Attorney, Agent, or Firm*—Smith Patent Office

(57) ABSTRACT

A photograph image-processing method comprises the steps of entering a film image for reading a film image by an image pickup device and generating color image data, generating concentration histograms for each of RGB color components from the color image data, relative-stretch-processing the concentration histograms, calculating and deriving a relative stretch ratio which maximizes the RGB superimposed area which has undergone relative-stretch processing, calculating and deriving an evaluation value of reliability with respect to the relative stretch ratio, calculating and deriving a correction stretch ratio based on the evaluation value, and conversion-processing RGB components of each pixel of the color image data in accordance with the correction stretch ratio.

20 Claims, 15 Drawing Sheets

| Fuzzy rule F(N) | | | | | | | | | |
|---|---|---|---|---|---|---|---|---|---|
| | Superimposed area of RGB histograms | | | | | | | | |
| | SMAL | | | MIDDLE | | | BIG | | |
| | Number of processed frame-images | | | Number of processed frame-images | | | Number of processed frame-images | | |
| | SMAL | MIDDLE | BIG | SMAL | MIDDLE | BIG | SMAL | MIDDLE | BIG |
| Image similarity SMAL | Rule 1 0.00 | Rule 3 0.00 | Rule 5 0.25 | Rule 7 0.25 | Rule 9 0.60 | Rule 11 0.80 | Rule 13 0.50 | Rule15 0.85 | Rule 17 1.00 |
| Image similarity BIG | Rule 2 0.00 | Rule 4 0.00 | Rule 6 0.00 | Rule 8 0.00 | Rule 10 0.15 | Rule 12 0.25 | Rule 14 0.25 | Rule 16 0.40 | Rule 18 0.60 |

FIG.9A

| Example of goodness-to-fit value | | | | |
|---|---|---|---|---|
| | Measured value | SMAL | MIDDLE | BIG |
| Superimposed area of RGB histograms | 0.85 | 0.00 | 0.10 | 1.00 |
| Number of processed frame-images | 6 | 0.00 | 1.00 | 0.50 |
| Image similarity | 0.50 | 1.00 | | 0.00 |

FIG.9B

| Degree of goodness-to-fit of each rule, example of V(N) | | | | | | | | | |
|---|---|---|---|---|---|---|---|---|---|
| | Superimposed area of RGB histograms | | | | | | | | |
| | SMAL | | | MIDDLE | | | BIG | | |
| | Number of processed frame-images | | | Number of processed frame-images | | | Number of processed frame-images | | |
| | SMAL | MIDDLE | BIG | SMAL | MIDDLE | BIG | SMAL | MIDDLE | BIG |
| Image similarity SMAL | Rule 1 0.00 | Rule 3 0.00 | Rule 5 0.00 | Rule 7 0.00 | Rule 9 0.10 | Rule 11 0.50 | Rule 13 0.00 | Rule 15 0.10 | Rule 17 0.50 |
| Image similarity BIG | Rule 2 0.00 | Rule 4 0.00 | Rule 6 0.00 | Rule 8 0.00 | Rule 10 0.00 | Rule 12 0.00 | Rule 14 0.00 | Rule 16 0.00 | Rule 18 0.00 |

FIG.9C

PHOTOGRAPH IMAGE-PROCESSING METHOD AND DEVICE THEREOF

BACKGROUND OF THE INVENTION

1. Field of the Invention

The present invention relates to a photograph image-processing method and the device thereof, which adjusts color balance of R (red),. G (green), and B (blue) (hereinafter called "RGB") so that natural color can be reproduced with respect to color image data obtained by reading photographic films, for example, negative films, etc.

2. Description of the Related Art

In conventional photograph printers, as a photograph image-processing method to print images recorded on negative film onto photographic printing paper, photosensitive material, in good color shades, an LATD (Large Area Transmittance Density) exposure system based on the Evans' theory is known. This exposure system is a method to adjust each exposure rate of RGB in such a manner that the RGB integrated light that penetrates negative film is reproduced in gray when any deviation is observed in color, in accordance with the Evans' theory that when colors of the whole negative film are mixed, the color of an average outdoor photographic subject gets closer to gray. Specifically, the negative film is irradiated with light, the transmitted light is read by an image pickup device to create RGB color image data, the mean value of the color image data is calculated and derived for every RGB of each pixel, and in analog type photograph printers, a photochromic filter is adjusted to expose the photographic printing paper, and in digital type photograph printers, the exposure rates from relevant light sources of RGB are adjusted, respectively, so that each mean value of RGB achieves the specified value that corresponds to gray, respectively.

According to the conventional photograph image-processing method described above, there was a problem that the negative film is overcorrected due to color deviations of a photographic subject (person, background) and a photographic print all the more difficult to see is outputted. For example, in the case of a scene in which a person is photographed against a background of the grass, the area of the grass is finished in gray, while in the area of the person, magenta which is a complementary color of the grass strongly appears. This kind of condition is called color failure, and as the measures, a method for removing the high chromatic pixel in the LATD exposure method or a method to find conditional mean values weighted by chroma, and others are proposed in Japanese Unexamined Patent Publication No. 2000-330221.

However, according to the above-mentioned method, in the case of a scene with large color deviation, the number of pixels used for calculation becomes extremely small, resulting in a tendency of short stability, and even with small weighting, if the number of pixels that correspond to this is large, the print results are not a little affected. Furthermore, since the threshold values to remove the high chroma pixels or weighting conditions by chroma were determined empirically, they were not always infallible and there was a room for further improvement.

SUMMARY OF THE INVENTION

In view of conventional defects, it is an object of the present invention to provide a photograph image-processing method and the device thereof, which can correct colors without being affected by color failure and without using the LATD exposure method which requires consideration to threshold values for high chroma pixel removal or weighting conditions by an empirical rule.

In order to achieve the above-mentioned object, the photograph image-processing method according to the present invention includes steps of entering a film image by reading a film image by an image pickup device and generating color image data, generating concentration histograms for each of RGB color components from the color image data, relative-stretch-processing the concentration histograms, calculating and deriving a relative stretch ratio which maximizes the RGB superimposed area which has undergone relative-stretch processing, calculating and deriving an evaluation value of reliability with respect to the relative stretch ratio, calculating and deriving a correction stretch ratio based on the evaluation value, and conversion-processing RGB components of each pixel of the color image data in accordance with the correction stretch ratio.

In addition, the photograph image-processing method includes steps of entering a film image by reading a film image by an image pickup device and generating color image data, generating concentration histograms for each of RGB color components from the color image data, relative-stretch-processing the concentration histograms, calculating and deriving a relative stretch ratio which maximizes the RGB superimposed area which has undergone relative-stretch processing, calculating and deriving an evaluation value of reliability with respect to the relative stretch ratio, calculating and deriving a correction stretch ratio based on the evaluation value, and adjusting a photochromic filter based on the correction stretch ratio and exposing to photographic printing paper.

In the relative-stretch-processing step described above, it is preferable that the step includes a base concentration calculation step that calculates and derives the base concentration of film from the color image data and a stretch processing calculating step that stretches the concentration histograms in the concentration axial direction with the base concentration used as a reference.

Furthermore, in the relative-stretch-processing step described above, it is preferable that the step includes a shift processing step that shifts concentration histograms of other colors in the concentration axial direction, respectively, with a concentration histogram of a specific color used as a reference and a stretch processing calculating step that stretches the concentration histograms of other colors in the concentration axial direction with the minimum concentration value used as a reference after shift processing.

The evaluation value described above is to be found by fuzzy inference based on a specified membership function for the superimposed area ratio of concentration histograms of each of generated RGB color components, the number of frame-images contained in the color image data, and the image similarity between frame-images.

The above-mentioned image similarity is to be expressed by the mean superimposed area ratio of RGB mean concentration histograms for each frame-image data contained in the color image data.

A photograph image-processing device according to the present invention which materializes the above-mentioned photograph image processing method includes a film image entering unit that reads a film image by an image pickup device and generates color image data, a concentration histogram generating unit generating a concentration histogram for each of RGB color components from the color image data, a relative-stretch-processing unit that relatively stretch-processes the concentration histograms, a relative stretch ratio calculating unit that calculates and derives a relative stretch ratio which maximizes the RGB superimposed area that has undergone relative-stretch processing, an evaluation value calculating unit that calculates and derives an evaluation value of reliability with respect to the relative stretch ratio, a correction stretch ratio calculating unit that calculates and derives a correction stretch ratio on the basis of the evaluation value, and a color data conversion-processing unit which conversion-processes RGB components of each pixel of the color image data in accordance with the correction stretch ratio.

In addition, another photograph image-processing device according to the present invention includes a film image entering unit that reads a film image by an image pickup device and generates color image data, a relative-stretch-processing unit that relatively stretch-processes the concentration histograms, a relative stretch ratio calculating unit that calculates and derives a relative stretch ratio which maximizes the RGB superimposed area that has undergone relative-stretch processing, an evaluation value calculating unit that calculates and derives an evaluation value of reliability with respect to the relative stretch ratio, a correction stretch ratio calculating unit that calculates and derives a correction stretch ratio on the basis of the evaluation value, and an exposure unit that adjusts a photochromic filter on the basis of the correction stretch ratio and exposes to photographic printing paper.

Furthermore, other inventions will be more fully apparent by referring to the following embodiments.

BRIEF DESCRIPTION OF THE DRAWINGS

FIG. 9A is a rule table used at the time of fuzzy inference;

FIG. 9B is an explanation table of goodness-to-fit value that shows a specific example used at the time of fuzzy inference;

FIG. 9C is an explanation table of degree of goodness-to-fit that shows a specific example used at the time of fuzzy inference;

DESCRIPTION OF THE PREFERRED EMBODIMENTS

Figure 1:
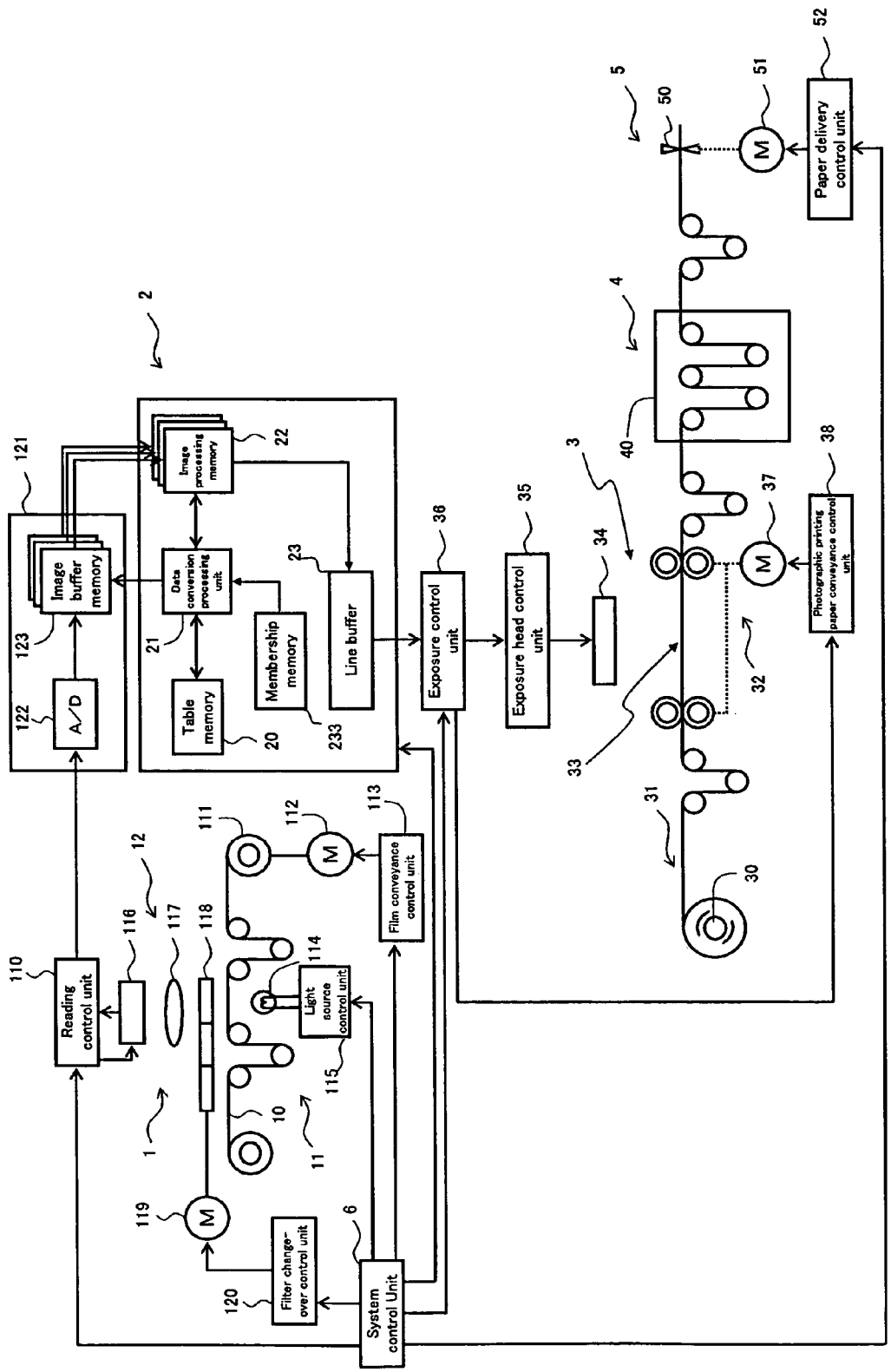
FIG. 1 is a functional block diagram of a photograph image processing apparatus according to the present invention.

Referring now to the drawings, a photograph image-processing method and a device using the method will be described in detail hereinafter.

A device based on the photo image-processing method according to the present invention, as shown in FIG. 1, includes a film image entering unit 1 that reads an image from film and stores in memory, an image data processing unit 2 that provides specified data processing, etc. for the color image data entered from the film image entering unit 1, an image exposing unit 3 that is equipped with an exposure head to expose photographic printing paper in accordance with the processed image data, a developing processing unit 4 that develops the exposed photographic printing paper, a paper delivery unit 5 that cuts the developed photographic printing paper in units of frames, and a system control unit 6 that integrates the whole of functional blocks described above and controls operation.

Figure 8:
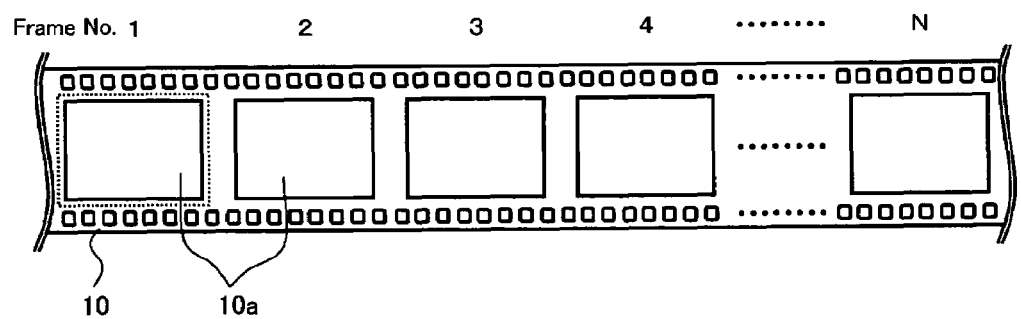
FIG. 8 is an illustration of negative film.

The film image entering unit 1 includes a film conveying unit 11 that intermittently conveys each frame 10a of developed color negative film 10 as shown in, for example, FIG. 8 and an image reading unit 12 that reads an image of each frame of film 10, and the film conveying unit 11 includes a winding roller 111, film conveying motor 112 that drives to rotate the winding roller 111, and a film conveyance control unit 113 that controls the film conveying motor 112, the image reading unit 12 includes a light source 114 located below the film 10, a light source control unit 115 that controls light-emitting intensity of the light source 114, an image pickup device 116 equipped with two-dimensional CCD, a reading control unit 110 that controls reading of an image by the image pickup device 116, lens 117 that forms each frame image of film 10 on a light-receiving surface of the image pickup device 116, a optical filter 118 that is installed between the film 10 and the lens 117 and separates the image of film 10 into three colors of RGB, a filter driving motor 119 that changes over and drives the optical filter 118, a filter change-over control unit 120 that drives and controls the filter driving motor 119, and an image data storage memory 121 that stores the image signal read by the image pickup device 116 as digital data. The image data storage unit 121 includes an A/D converter 122 that converts relevant analog image signals of RGB read by the image pickup device 116 into RGB digital image data in a 16-bit gradation level, respectively, and image buffer memory 123 that includes RAM which stores RGB three-color digital image data converted by the A/D converter 122 in units of frames, and others.

The image data processing unit 2 includes table memory 20 that stored table data, etc. used when various correction processing such as color correction and gradation correction, etc. later discussed and the specified processing such as layout processing, etc. are executed for the image data in frame units stored in the image buffer memory 123, image data conversion processing unit 21 equipped with an image processing CPU that reads the image data stored in the image buffer memory 123 and executes color correction processing, gradation correction processing, data conversion processing such as magnification conversion processing, etc., membership memory 233 that stores evaluation functions to evaluate and re-correct the color corrected values, image processing memory 22 in which the image data used and converted for conversion processing of image data by the image data conversion processing unit 21 is stored in an area divided according to RGB colors as final image as final image data in the units of frames, line buffer memory 23 that temporarily stores image data of one line of the final image data, and others.

The image exposing unit 3 includes a photographic conveyance unit 32 provided with a photographic printing paper conveyance control unit 38 that conveys a long sheet form photographic printing paper 31 wrapped around a roll cassette 30 towards an exposure station 33 by a conveying motor 37, an exposure head 34 of a PLZT system that exposes and scans the photographic printing paper 31 conveyed to the exposure station 33, an exposure head control unit 35 that drives and controls the exposure head 34, and an exposure control unit 36 that outputs image data from the line buffer memory 23 to the exposure head control unit 35 at a specified timing synchronized with the conveying speed of the photographic printing paper 31.

The developing processing unit 4 includes a processing tank 40 filled with developing processing liquid, such as developing solution, etc., and a conveyance control unit that conveys the exposed roll photographic printing paper 31 to the processing tank 40 and conveys the roll photographic printing paper 31 that has undergone each processing of developing, bleaching, and fixing to the paper delivery unit 5, and the paper delivery unit 5 includes a cutter 50 that cuts the roll photographic printing paper 31 which underwent developing processing at the developing processing unit 4 in the width direction and divides in the units of one frame and a paper delivery control unit 52 that drives and controls a cutting motor 51 that drives the cutter 50 and discharges and controls the cut photographic printing paper 31 to the outside of the device.

The system control unit 6 includes control CPU, ROM in which the control program is stored, RAM for data processing, and control signal I/O circuit for each functional blocks, and each functional block is integrated and controlled by the control program.

Figure 2:
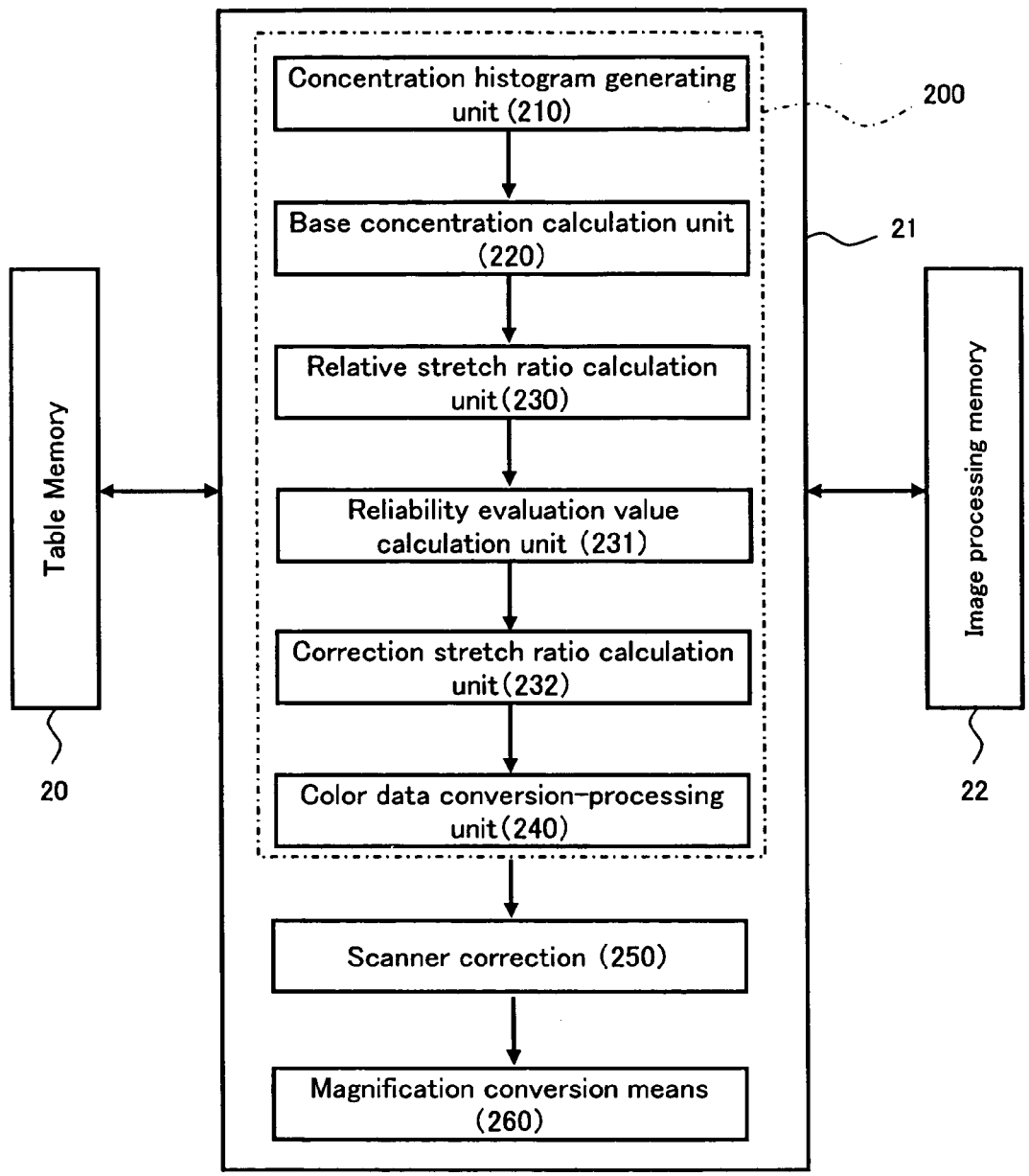
FIG. 2 is a functional block diagram of an image data processing unit.

Referring now to FIG. 2, the configuration of main functional blocks of the image data conversion processing unit 21 will be described and at the same time, the processing content will be described in accordance with the flow chart shown in FIG. 3. As shown in FIG. 2, the image data conversion processing unit 21 includes a color correction processing unit 200 which includes a concentration histogram generation unit 210 that generates concentration histograms for every RGB color component from the color image data of the subject film stored in the image data storage unit 121 (FIG. 1), a base concentration calculation unit 220 that calculates and derives the base concentration of film from the color image data, a relative stretch ratio calculation unit 230 that stretches the concentration histograms with the base concentration used as a reference and calculates and derives a relative stretch ratio which maximizes the RGB superimposed area, a reliability evaluation value calculation unit 231 that calculates and derives a reliability evaluation value to the relative stretch ratio, a correction stretch ratio calculation unit 232 that calculates and derives a correction stretch ratio based on the evaluation value, and a color data conversion-processing unit 240, as well as a scanner correction means 250 that carries out gradation correction, a magnification conversion means 260 that adjusts film image into the output size, and others.

The film varies in characteristics in accord with manufacturers and sensitivities, but in general, there is a certain correlation between RGB color components of color image data, and in particular, the photographed object which contains more achromatic colors provides higher RGB correlation. Consequently, by observing the conformity of concentration histograms in each of RGB color components, the color of achromatic color object, that is, the color manifested by the film characteristics can be detected.

According to the above-mentioned configuration, since the color balance of achromatic color object photographed on a film can be found by finding a specified relative stretch ratio on the basis of the concentration histograms of each of RGB color components generated from the color image data entered in the film image entering step and then finding the corrected stretch ratio which is corrected on the basis of the reliability of the relative stretch ratio, color correction free of color failure effects is enabled. By digital-exposing the photographic printing paper in accordance with the new color image data obtained in this way, proper digital photo prints are able to be obtained constantly.

Figure 3:
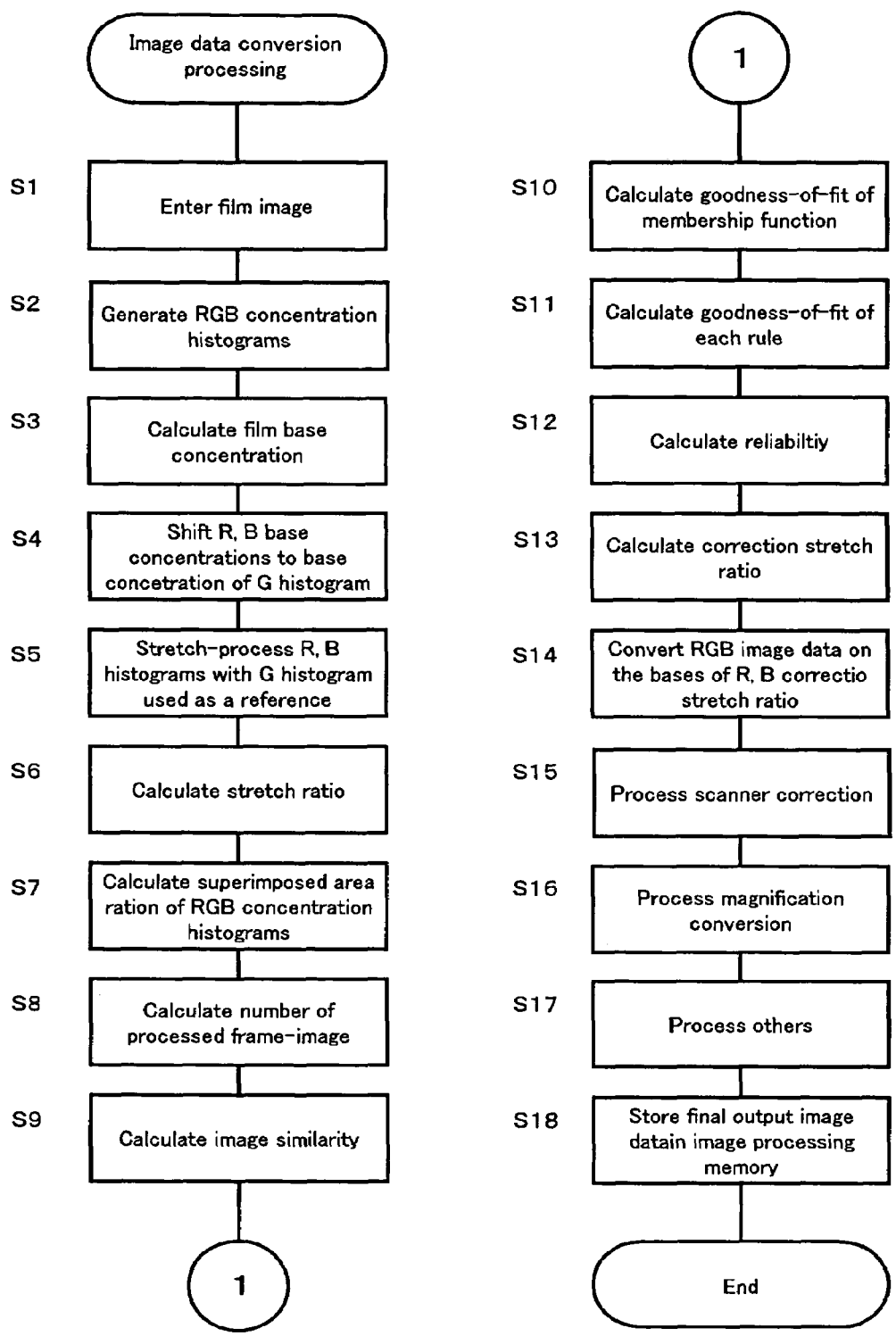
FIG. 3 is a flow chart that explains color conversion processing.
Figure 4A:
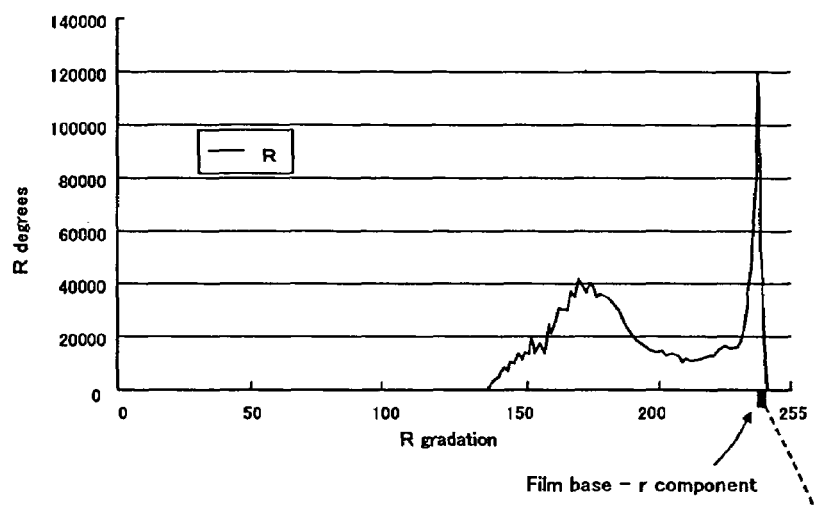
FIG. 4A is an illustration of concentration histogram of R component, G component, and B component.
Figure 4B:
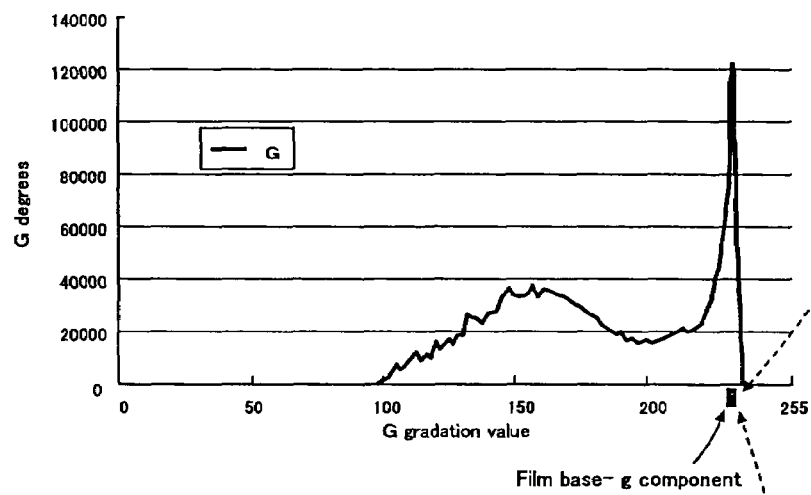
FIG. 4B is an illustration of concentration histogram of R component, G component, and B component.
Figure 4C:
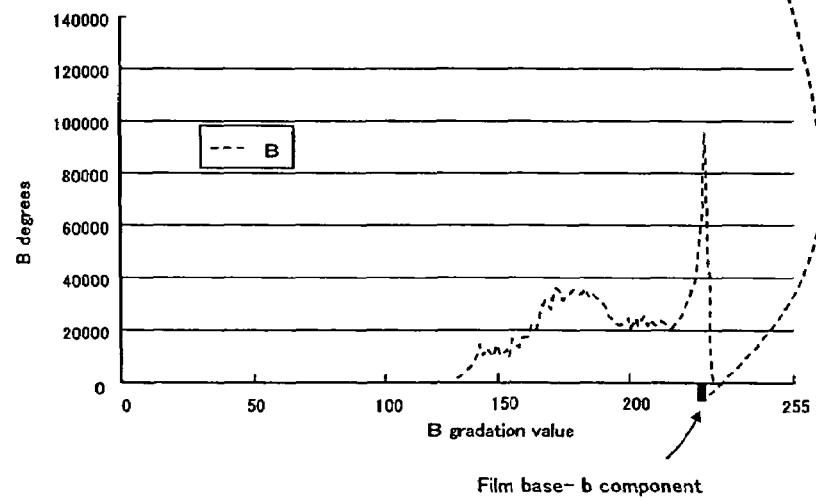
FIG. 4C is an illustration of concentration histogram of R component, G component, and B component.

As shown in FIG. 3, when a color image data which is generated by allowing the film image entering unit 1 to read a film image equivalent to one roll of 135 color negative film is stored in the image buffer memory 123 (S1), concentration histograms for each of RGB color components are generated to the color image data by the concentration histogram generating unit 210 in the table memory 20 (S2). Specifically, a frame image area is cut out from the whole image data read from a film by edge detection processing, and as shown in FIG. 8, concentration histograms to an area (area surrounded with broken line) slightly larger than the area of the cut frame image 10a. Conceptually, the concentration histogram is expressed in the two-dimensional coordinate system with the concentration values expressed in 256 stages from 0 (dense) to 255 (thin) as abscissa and the degrees (number of pixels) to the concentration value as ordinate, as shown in FIG. 4A, FIG. 4B, and FIG. 4C, and the concentration distribution of each of RGB color components of film image equivalent to one roll of 135 color negative film can be grasped.

Figure 5A:
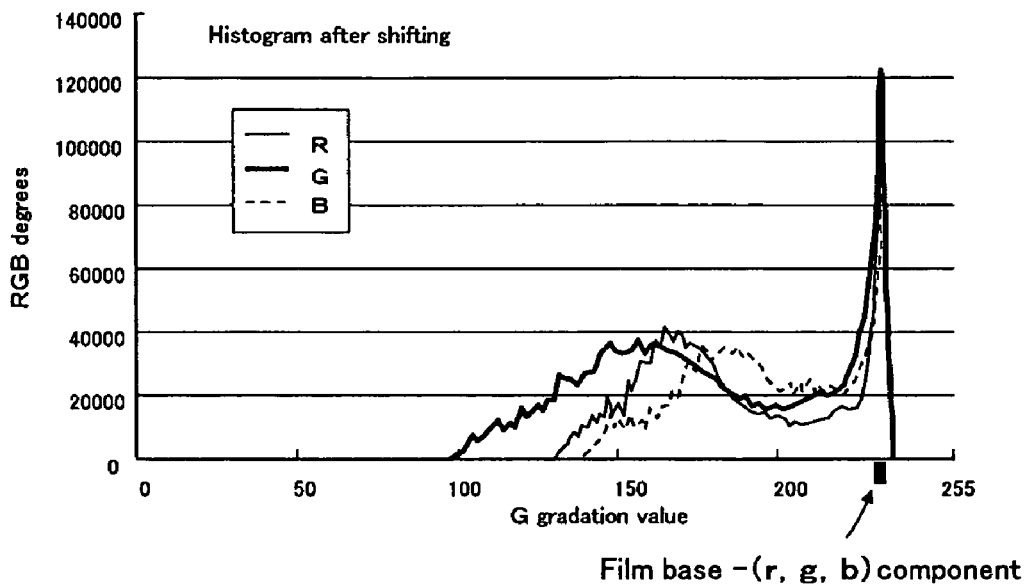
FIG. 5A is an illustration of a state with all the concentration histograms superimposed with the film base concentration rgb used as a reference.
Figure 5B:
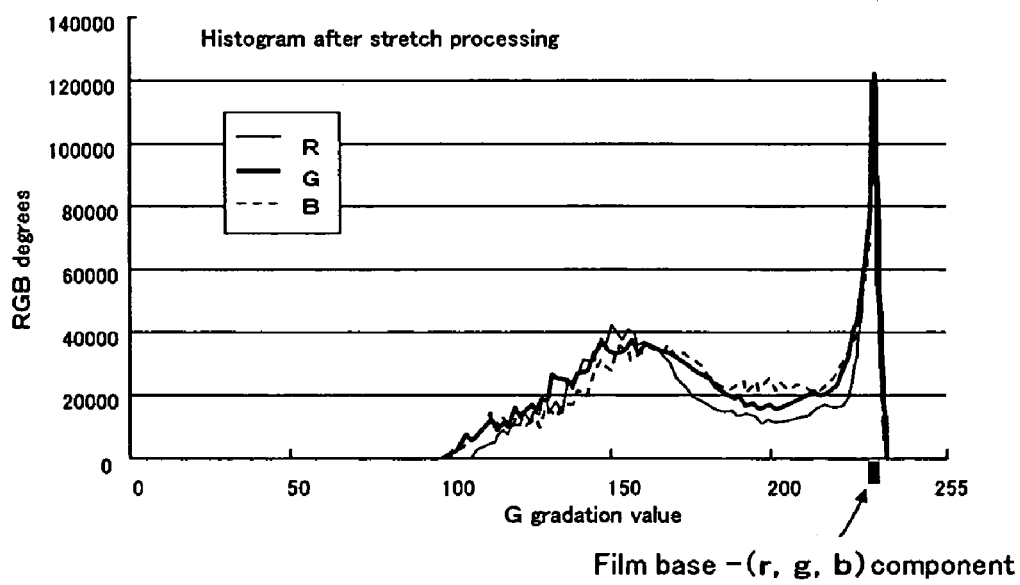
FIG. 5B is an illustration of a state with R and B concentration histograms expanded and contracted with the G concentration histogram used as a reference.

When the concentration values (r, g, b) of the texture portion of film (for example, unexposed area between frame and frame) is calculated and derived by the base concentration calculation unit 220 (S3), the concentration histograms are superimposed by the relative stretch ratio calculation unit 230 with the base concentration used as a reference and further stretched in the concentration axial direction, and the relative elongation ratio in the state which maximizes the RGB superimposed area, that is, the maximum stretch ratio is calculated and derived. To be specific, as shown in FIG. 5A, with the film base concentration g to the G component concentration histogram used as a reference, the R component concentration histogram and the B component concentration histogram are superimposed on the G component concentration histogram in such a manner that the R component film base concentration r coincides with the B component film base concentration b (S4), and as shown in FIG. 5B, the R component concentration histogram and the B component concentration histogram are stretched in the concentration axial direction so that the superimposed area is maximized (S5), and the respective stretch ratios of R component and B component in such event are calculated and derived as the maximum stretch ratios (S6).

By achieving the above-mentioned configuration, it becomes possible to find the relative stretch ratio which maximizes the RGB superimposed area when the concentration histograms are stretched in the concentration axial direction with the effects of base concentration eliminated when the film base concentration is identified in advance.

Furthermore, when the film base concentration is unknown, by adding the shift processing step, it becomes possible to find the relative stretch ratio which maximizes the RGB superimposed area when the concentration histograms are stretched in the concentration axial direction with the effects of base concentration practically eliminated.

The obtained maximum stretch ratio undergoes reliability evaluation by digitizing the evaluation with three items, "superimposed area ratio of concentration histograms of each of RGB color components," "number of frame images to be processed," and "frame image similarity," used as indices by the reliability evaluation value calculation unit 231.

Specifically, "superimposed area ratio of concentration histograms of each of RGB color components" is evaluated by calculating (S7) the RGB concentration histogram superimposed area ratio (value obtained by dividing the number of pixels of superimposed portion by total of pixels) when it exhibits the maximum stretch ratio obtained by stretch-processing concentration histograms of each of RGB prepared by integrating the frame image data (as described above, an area slightly wider than the recognized frame image area as the frame image data) stored in the image buffer memory 123 with the base concentration used as a reference.

That is, the evaluation carried out here is to evaluate the conformity of RGB concentration histograms finally obtained, and it indicates that the greater the superimposed area ratio, the smaller is the color deviation, and since this is consistent with the Evans' theory, too, it is able to judge that this ensures high reliability. Conversely, the smaller the superimposed area ratio, the greater is the color deviation, indicating the contradiction to the Evans' theory, too, and it is judged that reliability is low.

"Number of frame images to be processed" calculates (S8) and evaluates the number of frame images stored in the image buffer memory 123. Because as the number of frame images increases, the amount of information obtained increases, it is therefore judged that the evaluation itself can be increased, too. Conversely, because as the number of frame images decreases, the amount of information obtained decreases, too, it is judged that the reliability of evaluation itself is decreased.

Figure 7:
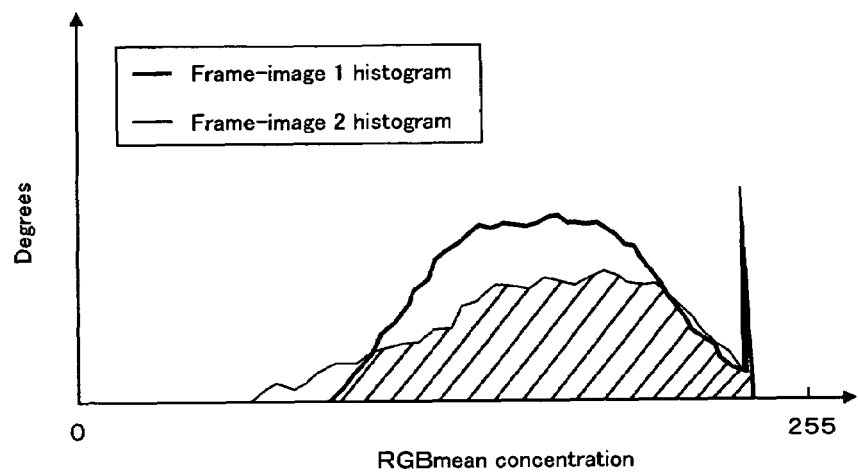
FIG. 7 is an illustration of superimposed area ratio in the frame-image similarity.

"Frame image similarity" evaluates the comparison between frame images using RGB mean concentration histogram (with (r+g+b)/3 as abscissa and degrees (number of pixels) as ordinate) for all the combinations with respect to frame images stored in the image buffer memory 123. Specifically, as shown in FIG. 7, mean concentration histograms of frame images and other frame images are superimposed and the number of pixels of the superimposed section is divided by the total number of pixels, that is, a mean value of unit similarity of all combinations between frame images are calculated and evaluated with the superimposed area ratio used as unit similarity (S9).

When concentration histograms are generated in the units of frame images, there are cases in which color deviation of photogenic subject exerts a great influence, and it is, therefore, preferable to generate concentration histograms on the basis of all the image data for film images equivalent to one roll of film in order to secure sufficient data volume, but it is unable to eliminate influences of color deviations of photogenic subject when all are photographed images of same or similar scenes. Now, the similarity of two frame images can be easily determined by generating and comparing respective RGB mean concentration histograms. Therefore, it becomes possible to find the overall image similarity by finding the mean value of superimposed area ratio of RGB mean concentration histograms when two sets of frame images are compared from a plurality of frame images read from the film.

The evaluation carried out in this step is to evaluate the amount of information as the image photographing conditions, and in case that a large similarity is achieved between frame images, image conditions obtained decrease because photogenic subjects and photographing conditions are likely to be similar, and it is judged that the reliability is low. Conversely, in case that a small similarity is achieved between frame images, image conditions obtained increase because photogenic subjects and photographing conditions are likely to greatly vary and it is judged that the reliability is high.

The indices of three items described above are calculated as goodness-to-fit by comparing the membership functions (shown in FIG. 6A, 6B, and 6C) stored in membership memory 233 by the reliability evaluation value calculation unit 231 on the basis of the relevant values calculated (S10), and serve as specifically digitized evaluation indices.

By the way, the membership functions stored in membership memory 233, fuzzy rule table later discussed, and each value of them indicate only an example of the optimum values empirically obtained by analyzing an enormous amount of data (photographed image data under various light sources, photogenic subject image data, etc.) accumulated to date and shall not be limited to these. In addition, the membership memory 233 is able to have its functions suitably rewritten.

Let F(N) (N: rule No. in the table) denote the reliability of each rule of the fuzzy rule table shown in FIG. 9A, calculate the goodness-to-fit in each rule from AND (MIN) calculation (S11), and designate it to V(N) (N: rule number in the table), and calculating by (Eq. 1), we have the final reliability (S12).

$$\sum_{N=1}^{N=18}(V(N) \times F(N)) \bigg/ \sum_{N=1}^{N=18}V(N) \qquad \text{(Eq. 1)}$$

Figure 6A:
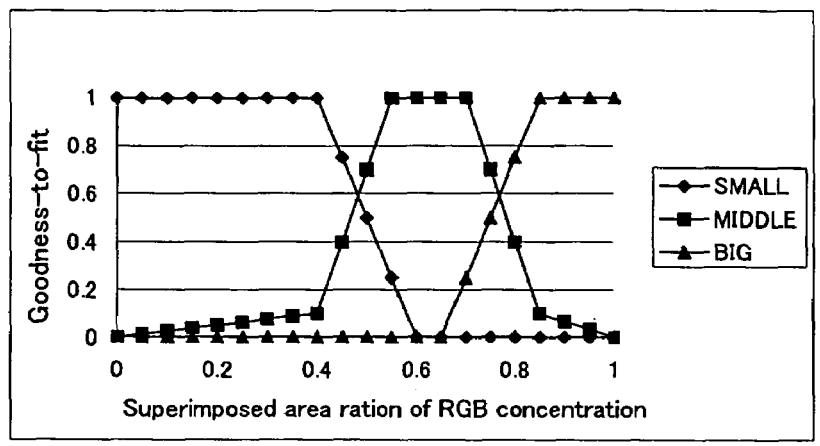
FIG. 6A is an illustration of a membership function, which is an illustration of superimposed area ratio of RGB concentration histograms.
Figure 6B:
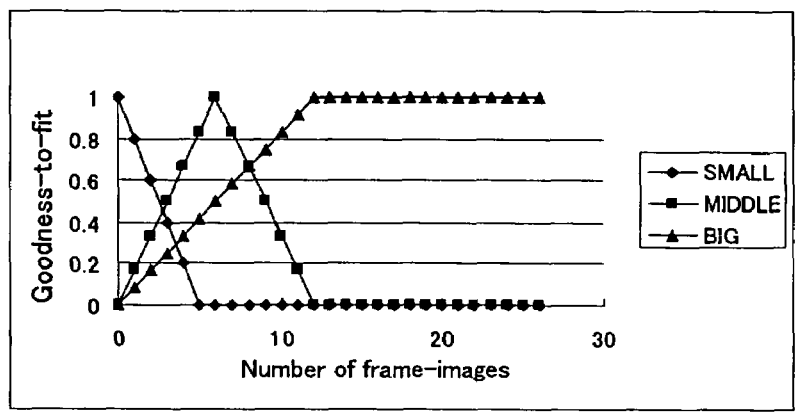
FIG. 6B is an illustration of a membership function, which is an illustration of number of frame-images to be processed.
Figure 6C:
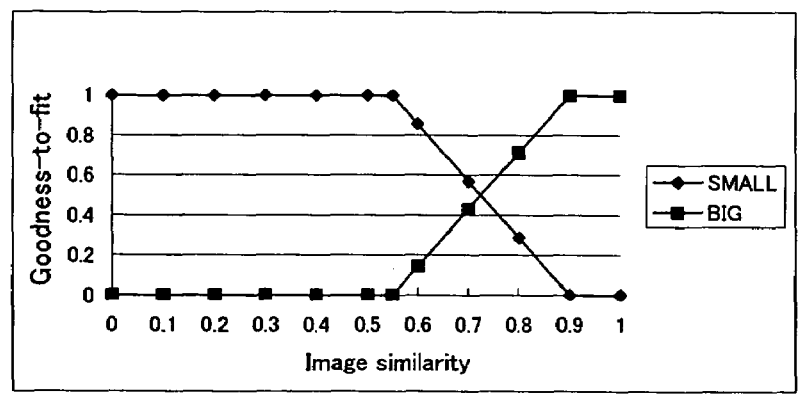
FIG. 6C is an illustration of a membership function, which is an illustration of frame-image similarity.

For example, let "superimposed area ratio of RGB concentration histograms" be 0.85, "number of frame images to be processed" be 6, and "frame image similarity" be 0.5, the relevant goodness-to-fits can be found as the values shown in FIG. 9B from the membership functions of FIG. 6A, 6B, and 6C, and the goodness-to-fit of each rule can be obtained as the values shown in FIG. 9C by AND (MIN) calculations using these. When the reliability is found by the use of these values, about 0.87 is given.

The correction stretch ratio calculation unit 232 carries out weighted mean calculation of stretch ratio of each of R component and B component using (Eq. 2) in accordance with the reliability calculated and the corrected stretch ratio is calculated (S13).

Corrected stretch ratio=(1−reliability)+stretch ratio× reliability (Eq. 2)

Now, in case that reliability is zero, it means that the stretch ratio calculated is not at all reliable. Therefore, the corrected stretch ratio in this case is assumed to be 1. In addition, in case that the reliability is 1, it means that the stretch ratio is completely reliable. Therefore, the stretch ratio calculated is used as the corrected stretch ratio as it is. In case of other conditions, the value found from the (Eq. 2) is used as the corrected stretch ratio.

Based on the corrected stretch ratio found in this way, RGB components of each pixel of respective frame image data stored in the image buffer memory 123 are converted (S14). For example, when the corrected stretch ratio of R component is found to be Mr and the corrected stretch ratio of B component to be Mb with the G component used as a reference, the R component of each pixel is Mr-multiplied and B component Mb-multiplied to calculate and derive new RGB pixel data. By the way, the resolution of abscissa of the concentration histogram is not particularly limited and can be suitably set.

This concludes color correction processing and scanner correction processing (S15), magnification conversion processing (S16), and other necessary processing (S17) are successively executed, and the final output image data is stored in image processing memory 22 (S18).

In the above-mentioned embodiment, description is made on an example to find the maximum stretch ratio of R, B components with the G component used as a reference, but this may be configured to find the maximum stretch ratio with the R component or B component used as a reference, and any of the reference may be used if the relative stretch ratio that maximizes the RGB superimposed area is achieved.

In the above-mentioned embodiment, all the frame images stored in image buffer memory 123 are collectively subject to digitized indices, but frame images subject to digitized indices may be selected. That is, a configuration which can omit apparent defective photographed images, etc. may be used.

In the above-mentioned embodiment, it is described that the color image data generated by reading film images equivalent to one roll of 135 color negative film by the film image entering unit 1 is stored in image buffer memory 123 and conversion processing is provided on the color image data, but the image data subject to concentration histograms generated by the concentration histogram generating unit 210 may be different from the image data converted by the color data conversion-processing unit 240. For example, the image data subject to concentration histograms generated by the concentration histogram generating unit 210 is the read data with low resolution, which is the read data in the pre-scan mode to be continuously read by the film image entering unit 1 at high speed, and the image data converted by the color data conversion-processing unit 240 is the read data with high resolution by full-scale scan mode which is intermittently read frame by frame by the film image entering unit 1. By having this configuration, the volume of image buffer memory 123 can be suppressed.

The second embodiment will be discussed as follows. In place of the image conversion processing unit 21 in the first embodiment discussed above, as shown in FIG. 10, an image conversion-processing unit 71 that configures a main functional block as shown in FIG. 10 is used, and referring now to the flow chart shown in FIG. 11, the description will be made.

Figure 10:
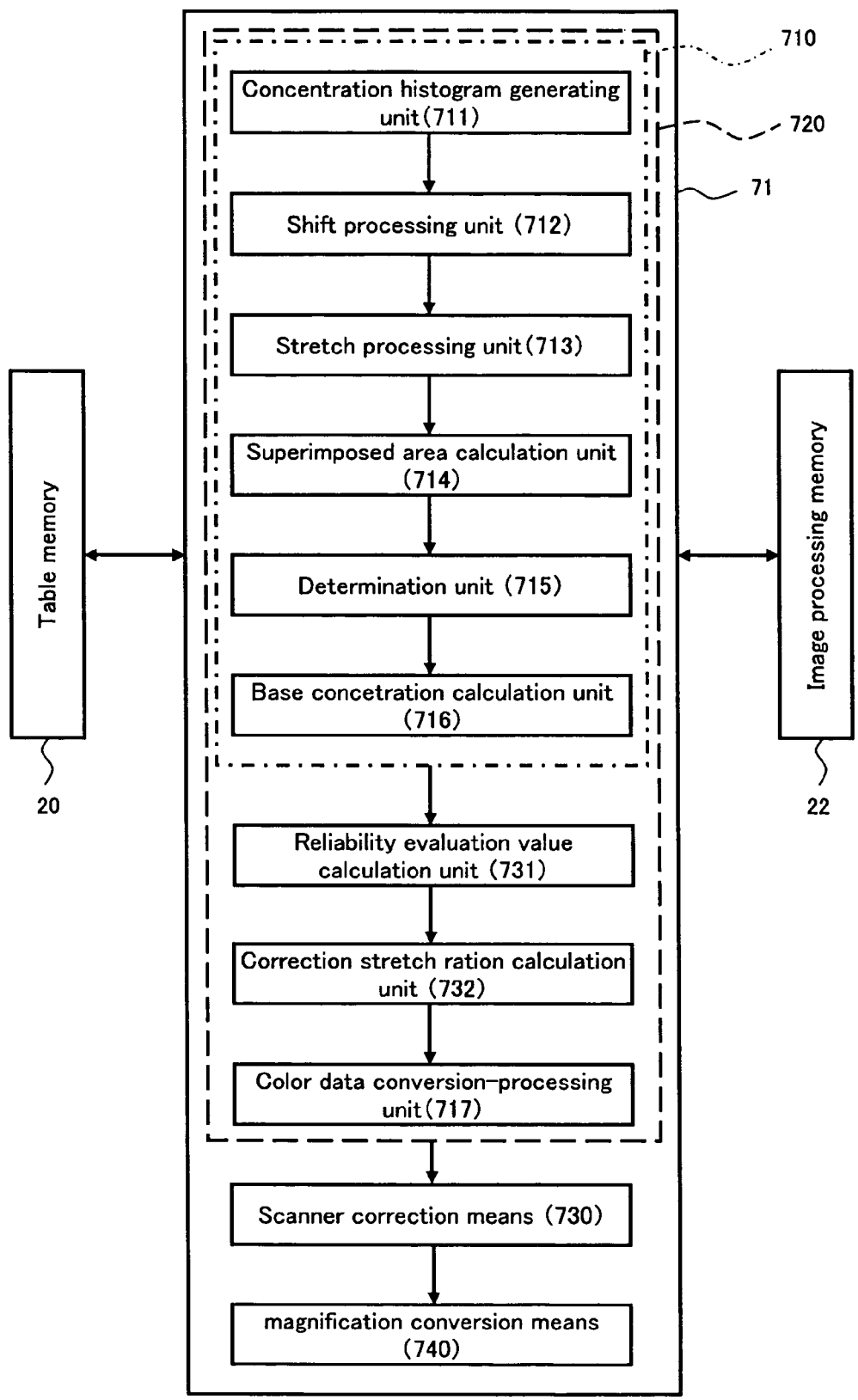
FIG. 10 is a functional block diagram of an image data processing unit related to a second embodiment.
Figure 11:
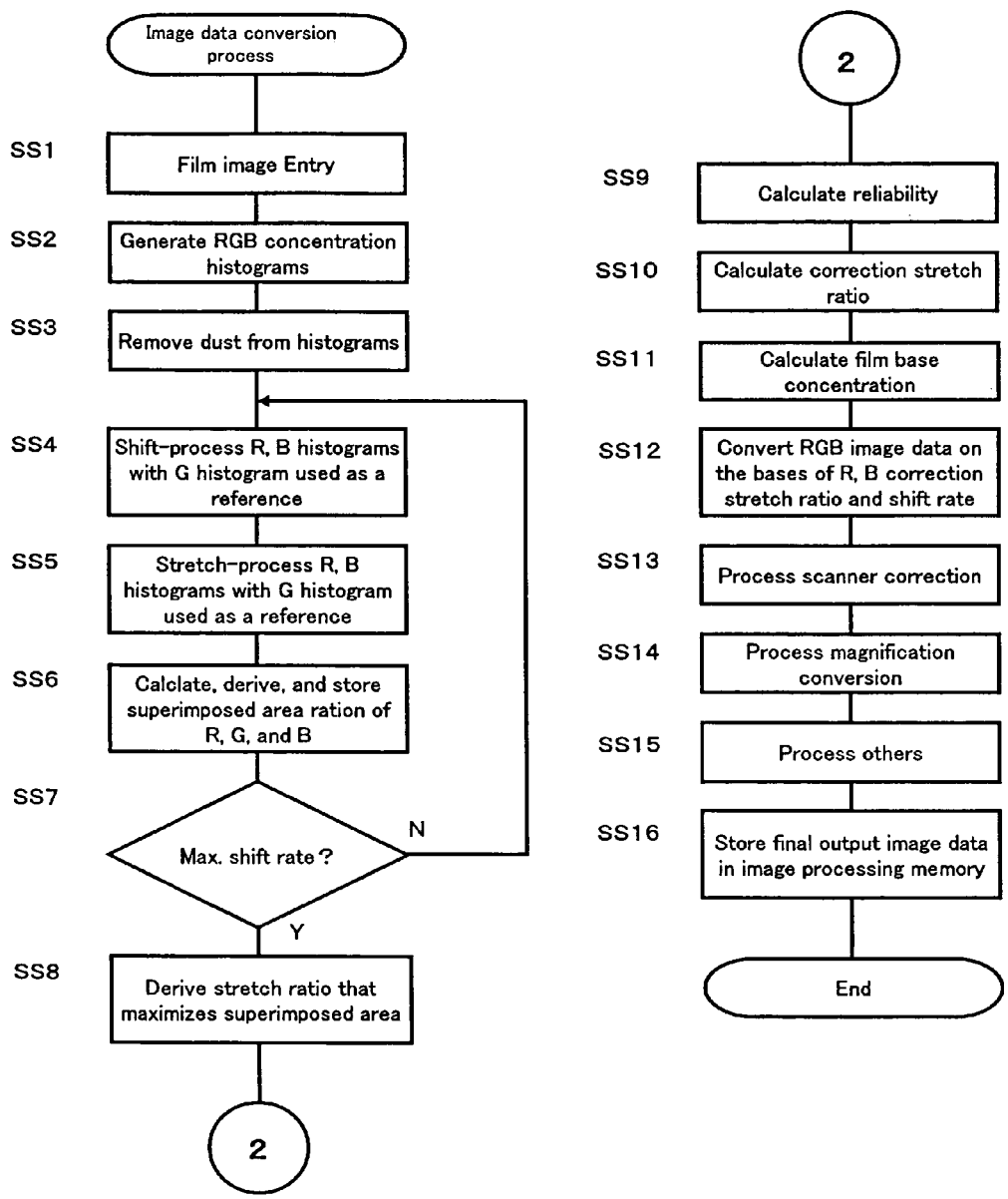
FIG. 11 is a flow chart that explains color conversion processing related to the second embodiment.

The image data conversion-processing unit 71, as shown in FIG. 10, includes a color correction unit 720, scanner correction unit 730 that corrects gradations, magnification conversion means 740 that adjusts film images to the output size, and others.

The color correction unit 720 includes a base concentration detection unit 710 that finds the film base concentration from color image data of low resolution read by the pre-scan mode, reliability evaluation value calculation unit 731 that calculates and derives the evaluation value of reliability to the relative stretch ratio obtained by the base concentration detection unit later discussed, correction stretch ratio calculation unit 732 that calculates and derives the corrected stretch ratio based on the evaluation value, and color data conversion-processing unit 717 that finds the correction data for color balance adjustment with the film base concentration detected from the base concentration detection unit 710 used as a reference, and at the same time that corrects high-resolution color image data read in the full-scale scan mode on the basis of the corrected stretch ratio and the correction data.

The base concentration detection unit 710 includes a concentration histogram generating unit 711 that generates concentration histograms for each of RGB color components from color image data of the subject film stored in the image data storage unit 121 (see FIG. 1), shift processing unit 712 that shifts concentration histograms of other colors in the concentration axial direction, respectively, with the concentration histograms of specific colors used as a reference, stretch processing unit 713 that stretches the concentration histograms of other colors in the concentration axial direction with the minimum concentration value used as reference after shift-processing, superimposed area calculation unit 714 that calculates and derives, respectively, superimposed areas of concentration histograms by combinations of two color components after stretch processing, determination unit 715 that finds the amount of shift and stretch ratio which maximize the total amount of respective superimposed areas calculated and derived, and base concentration calculation unit 716 which finds the base concentration position for each color component in the original concentration histogram based on the amount of shift and stretch ratio with the position that indicates the minimum value in the minimum concentrations of each concentration histogram at the amount of shift and stretch ratio found at the determination unit 715 used as the base concentration position, and which calculates and derives the concentration at the position as the film base concentration value.

Figure 12A:
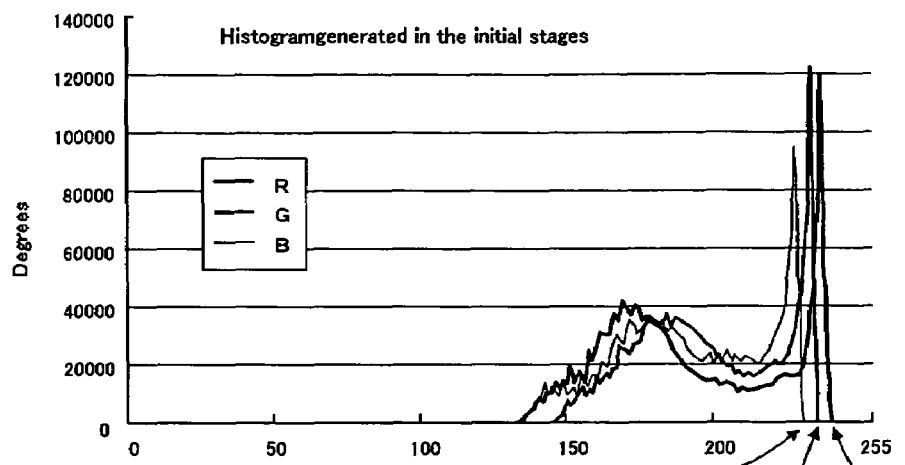
FIG. 12A is a concentration histogram, which is a histogram of RGB concentrations generated on the basis of image data read from a film.

As shown in FIG. 3, when the color image data that contains film image equivalent to one roll of 135 color negative film read by the film image entering unit 1 in the pre-scan mode is stored in image buffer memory 123 (SS1), concentration histograms of each of RGB color components to the color image data are generated in the table memory 20 area by the concentration histogram generation unit 711 (SS2). The concentration histogram is expressed in the two-dimensional coordinate system with the concentration values expressed in 256 stages from 0 (dense) to 255 (thin) as abscissa and the degrees (number of pixels) to the concentration value as ordinate, as shown in FIG. 12A, and the concentration distribution of each of RGB color components of film image equivalent to one roll of 135 color negative film containing a transparent section film can be grasped. By the way, the resolution of abscissa of the concentration histograms shall not be particularly limited and may be suitably set.

Of the degrees that correspond to gradation values of generated concentration histograms, the degrees less than 0.1% of the total number of pixels read are set to 0 in order to eliminate them as noise components (SS3). For the relevant concentration RGB histograms with the noise components removed in this way, concentration histograms of other colors are shifted in the concentration axial direction with the concentration histograms of specific colors used as references in such a manner that the conformity of concentration histograms of each color component can be maximized by the shift processing unit 712, and thereafter, concentration histograms of other colors are stretched in the concentration axial direction with the minimum concentration value used as the reference by the stretch processing unit 713.

Figure 13A:
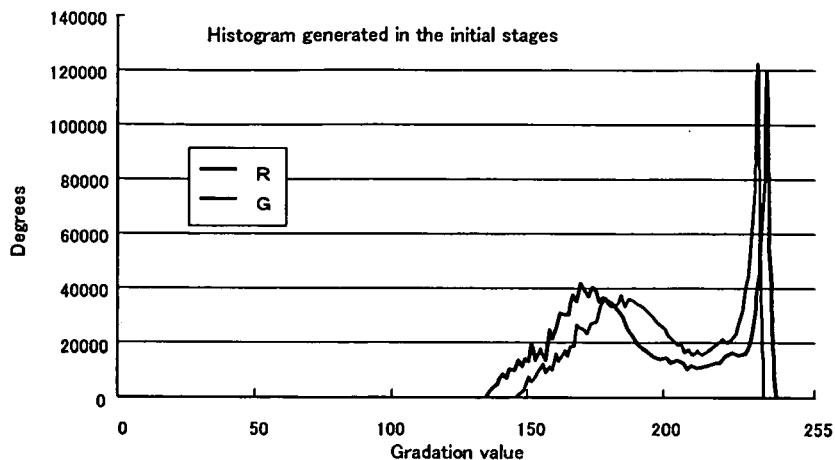
FIG. 13A is a concentration histogram, which is a histogram of RG concentrations generated on the basis of image data read from a film.
Figure 13B:
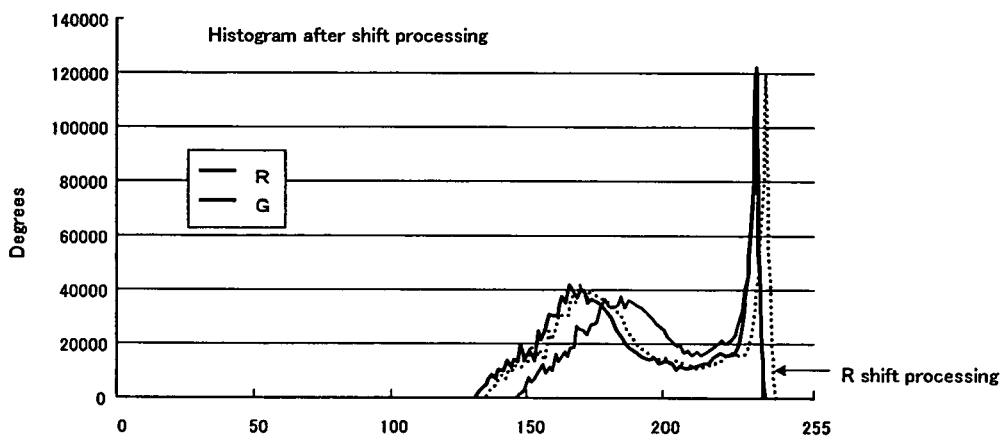
FIG. 13B is a concentration histogram that is a histogram of RG concentrations, which explains shift processing.
Figure 14A:
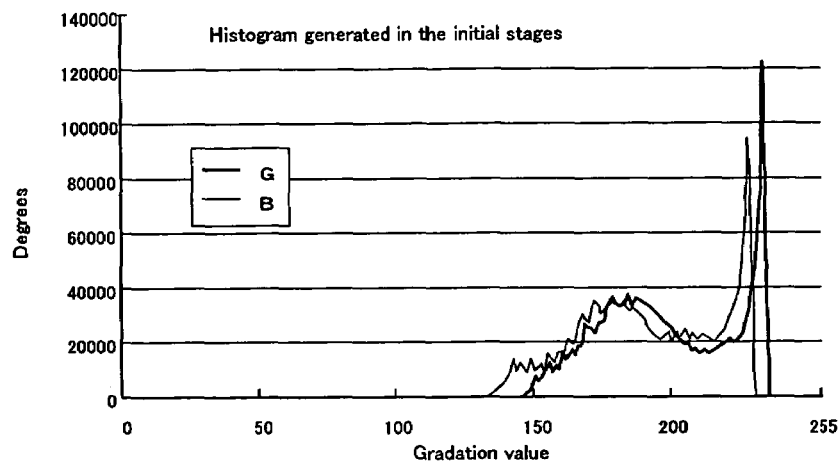
FIG. 14A is a concentration histogram, which is a histogram of GB concentrations generated on the basis of image data read from a film.

Specifically, the shift processing unit 712 shifts the R component concentration histogram (shown with broken line) initially generated with the G component concentration histogram used as a reference as shown in FIG. 13B in the concentration axial direction, in this case, in the gradation axial direction by the specified volume only (shown with solid line) with respect to the G component and R component concentration histograms shown in FIG. 13A. And at the same time, the B component concentration histogram (shown in broken line) initially generated with the G component concentration used as a reference in the concentration axial direction as shown in FIG. 14B, in this case, in the gradation axial direction by the specified volume only (shown in solid line) with respect to the concentration histograms of G component and B component shown in FIG. 14A (SS4).

In shift processing, with the deviation of the minimum concentration value of each histogram to the minimum value in the minimum concentration values of concentration histograms of each of color components designated as the maximum shift volume, histograms are shifted to the minimum value. That is, in the case shown in FIG. 12A, histograms are shifted to the minimum value (maximum Rmax of gradations) with the deviations |Rmax−Gmax|, |Rmax−Bmax| with other concentration histograms designated as the maximum shift volume with respect to the minimum value (maximum Rmax of gradations) in the minimum concentration values (maximum gradation values Rmax, Gmax, Bmax) of each concentration histogram of RGB.

For example, when the R component concentration histogram is shifted with the G component concentration histogram used as a reference, the histogram is shifted only by the initial value preset with the maximum value Rmax of R gradation set as a reference (−10 scale (this value is not particularly restricted but is properly set)), and thereafter, the histogram is shifted in the direction where the gradation is increased in increments of 1 scale to the scale that corresponds to the maximum shift volume (|Rmin−Gmin|). In the similar manner, when the B component concentration histogram is shift-processed, the histogram is shifted only by the initial value (−10 scale) preset with the maximum value Bmax of B component gradation used as a reference, and thereafter, the histogram is shifted in the direction where the gradation is increased in increments of 1 scale to the scale that corresponds to the maximum shift volume (|Rmin−Bmin|).

Figure 13C:
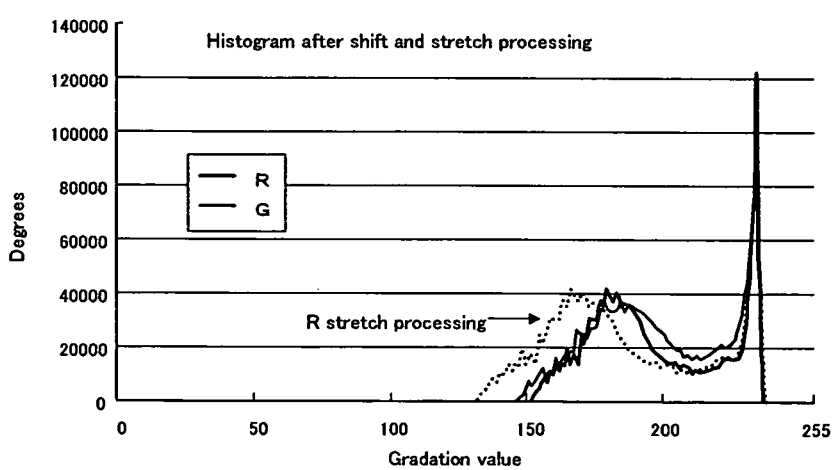
FIG. 13C is a concentration histogram that is a histogram of RG concentrations, which explains stretch processing.
Figure 14B:
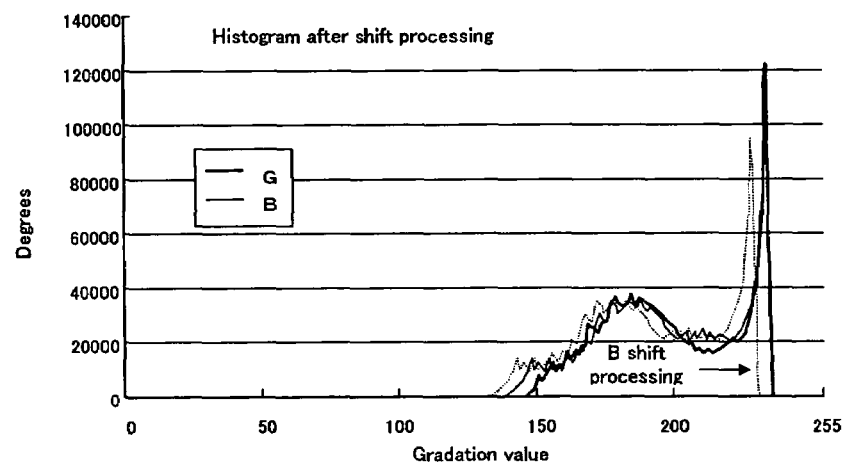
FIG. 14B is a concentration histogram that is a histogram of GB concentrations, which explains shift processing.
Figure 14C:
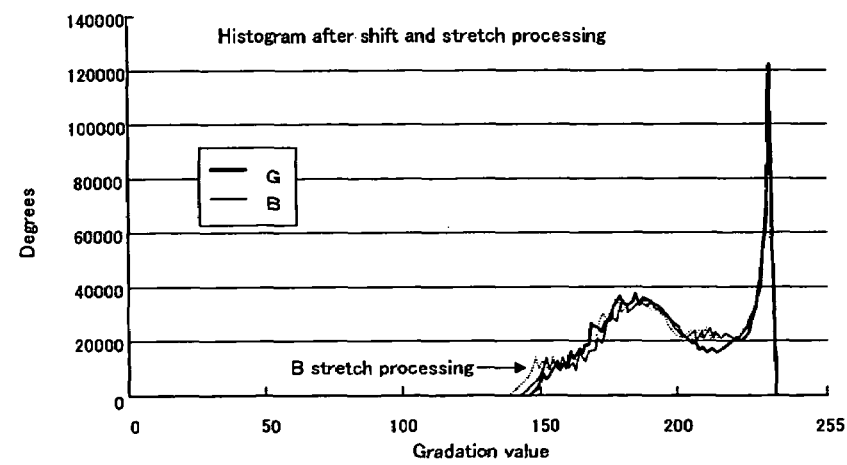
FIG. 14C is a concentration histogram that is a histogram of GB concentrations, which explains stretch processing.
Figure 15A:
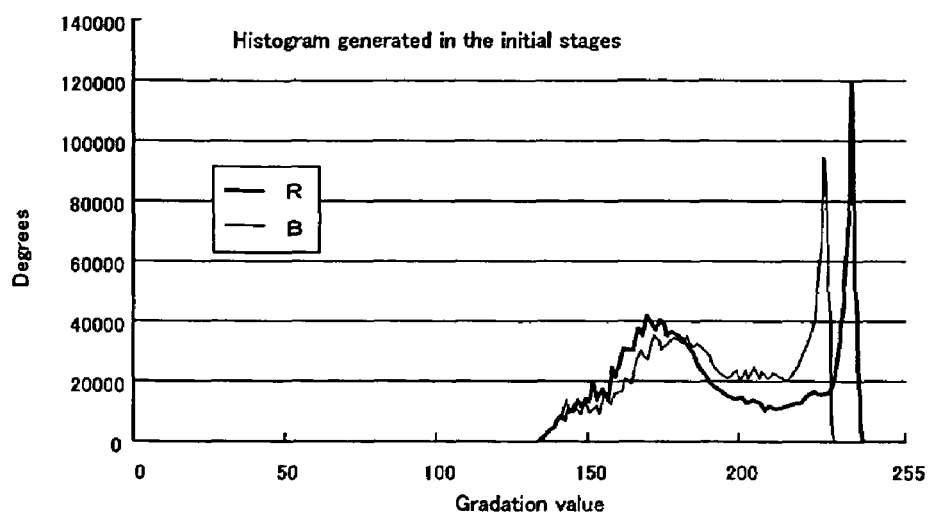
FIG. 15A is a concentration histogram, which is a histogram of RB concentrations generated on the basis of image data read from a film.
Figure 15B:
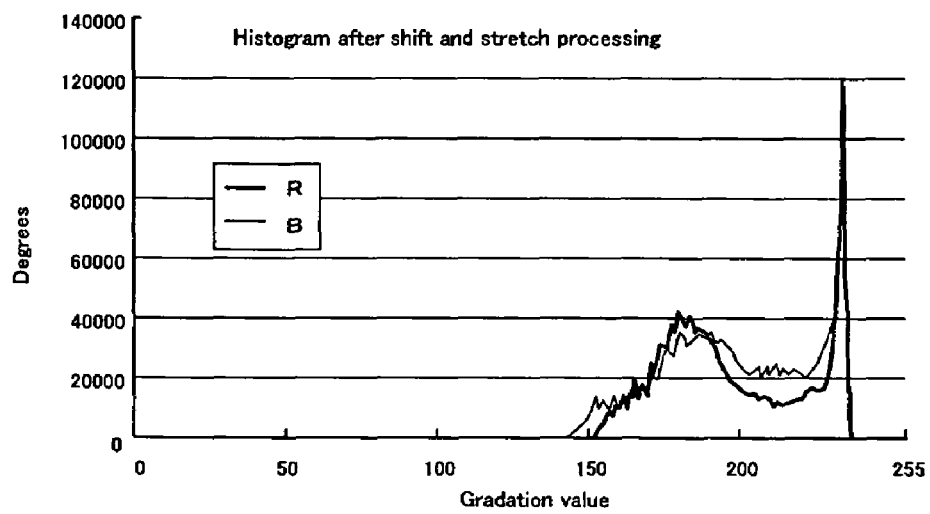
FIG. 15B is a concentration histogram, which is a histogram of RB concentrations after shift-processing and stretch-processing of FIG. 13B, FIG. 13C and FIG. 6B, and FIG. 6C.

After shift-processing, the stretch processing unit 713 carries out stretch processing stepwise so that the position that indicates the minimum gradation value of R component concentration histogram and B component concentration histogram, respectively, that is, the left end of the R component concentration histogram of FIG. 13B and the left end of the B component concentration histogram of FIG. 14B are located at each scale in the range of ±15 scale from the relevant positions (this value is not particularly restricted, either, and may be properly set) (SS5). One example of concentration histograms of each component is shown in FIG. 13C, FIG. 14C, and FIG. 15B. By the way, FIG. 15A shows concentration histograms of R component and B component initially generated.

The superimposed area calculation unit 714 calculates and derives the RGB color component superimposed area of concentration histograms after processing of Steps SS4 and SS5 described above, that is, the area of superimposed portion of R, G, and B concentration histograms (SS6).

Figure 12B:
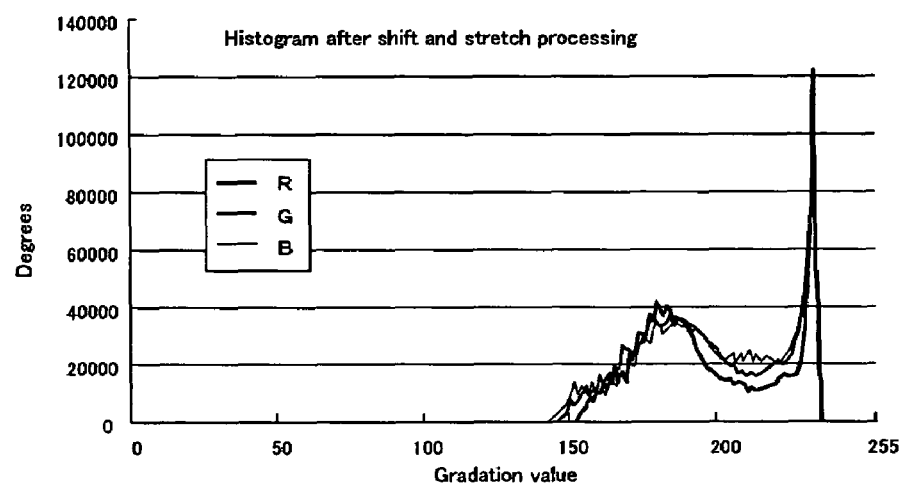
FIG. 12B is a concentration histogram, which is a histogram of RGB concentrations after shift-processing and stretch-processing.

The processing from step SS4 to step SS6 is repeated and the determination unit 715 repeats processing to find out the R, G, and B superimposed area of concentration histograms every time processing from step SS4 to step SS6 is repeated (SS7), and finds the stretch ratio that maximizes the relevant superimposed area (SS8). FIG. 12B shows histograms of each color component after shift processing and stretch processing when the superimposed area is maximized.

For the maximum stretch ratio, the reliability is evaluated in the similar manner as in the first embodiment described above and the reliability is calculated by digitizing the evaluation with three items, "superimposed area ratio of concentration histograms of each of RGB color components," "number of frame images to be processed," and "frame image similarity," used as indices by the reliability evaluation value calculation unit 731 (SS9: same as step S7 to step S12 of the first embodiment).

The correction stretch ratio calculation unit 732 carries out weighted mean calculation of stretch ratio of each of R component, G component and B component using (Eq. 2) in accordance with the reliability calculated and the corrected stretch ratio is calculated (SS10).

Figure 16:
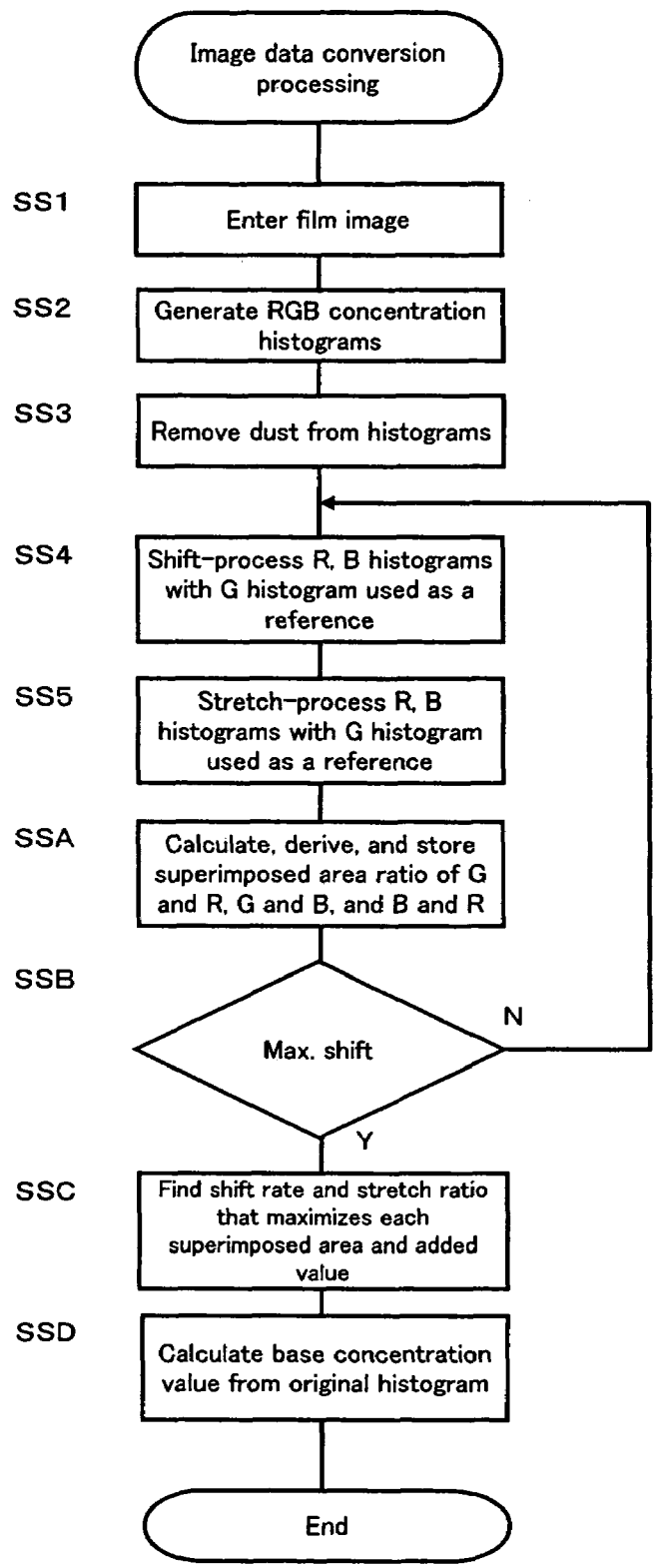
FIG. 16 is a flow chart that explains calculation and derivation of the base concentration in the second embodiment.

Then, the concentration value (base concentration) of the texture portion of film is calculated and derived (SS11). The base concentration calculation unit 716 can calculate and derive the base concentration in the same manner as the first embodiment described above. In addition, as another method, it is possible to calculate and derive the base concentration by the method shown in the flow chart of FIG. 16.

That is, after carrying out processing of step SS1 to step SS5 described above, the superimposed area of concentration histograms by combining two color components of each concentration histogram after processing of step SS4 and step SS5, that is, areas of superimposed portions of concentration histograms of G and R, G and B, and B and R, respectively, are calculated and derived by the superimposed area calculation unit 714 (SSA).

Then, processing of steps SS4 to SSA is repeated and processing to find the added value of superimposed areas of G and R, G and B, and B and R of concentration histograms is repeated by the determination unit 715 every time processing of step SS4 to step SSA is carried out (SSB) and the amount of shift and stretch ratio which maximize the relevant added value are found (SSC).

The base concentration calculation unit 716 recognizes the maximum value (minimum value) of the maximum gradations (minimum concentration) of each histogram in such event as the base concentration position, calculates back to find the base concentration position for each color composition in the original concentration histogram on the basis of the relevant amount of shift and stretch ratio, and calculates and derives the concentration at the position as the film base concentration value (SSD).

Now, returning to FIG. 11, the color data conversion-processing unit 717 stores the amount of shift found at the determination unit 715 with the relevant film base concentration found used as a reference and the corrected stretch ratio found at the correction stretch ratio calculation unit 732 in the table memory 20 as correction data for color balance adjustment, and carries out correction-processing on the high-resolution color image data read in the full-scale scan mode (SS12). That is, the color data conversion-processing unit 717 carries out conversion-processing on RGB components of each pixel of high-resolution frame image data stored in the image buffer memory 123 at the time of full-scale scanning, respectively. In addition, thereafter, scanner correction processing (SS13), magnification conversion processing (SS14), and other necessary processing (SS15) are executed.

In the above-mentioned embodiment, as a process to calculate and derive the reliability evaluation value for the maximum stretch ratio, the case in which the evaluation values of the superimposed area ratio of concentration histograms of RGB color components generated, number of frame images contained in the color image data, and the image similarity between frame images are found by the fuzzy inference based on specified membership functions is described, but now the image similarity between frame images should not be limited to the RGB mean concentration but other indices such as mean color difference data, etc. may be used. In addition, a specific method to find the evaluation value is not limited to the fuzzy inference but other statistic calculation methods may be used, or a pattern recognition method, etc. using a neural network which calculates and derives the specified evaluation values on the basis of the indices including the superimposed area ratio of concentration histograms of RGB color components generated, number of frame images contained in the color image data, and the image similarity between frame images may be used.

The photograph image-processing method and the device thereof according to the present invention are particularly suited for digital exposure system photograph processing devices, and in the above-mentioned embodiment, the case with the PLZT system exposure head adopted is described, but the exposure head may be applied to various digital exposure heads of laser system, FOCRT system, and others. In addition, the present invention shall not be limited to the above-mentioned embodiment but can be suitably configured within the scope of characteristic configurations and their combinations described in the column of "Problems that this invention is to solve."

Furthermore, the photograph image-processing method and the device thereof according to the present invention are applicable to analog exposure system photograph processing devices, and in such event, the devices should be configured to equip the light source, a mirror tunnel that uniformly adjusts a bundle of rays from the light source and RGB photochromic filter, in place of the digital exposure unit, and an analog exposure unit which projects and exposes the film fixed to negative mask onto photographic printing paper, and should adjust the photochromic filter in accordance with the relative stretch ratio and expose the photographic printing paper to the light.

What is claimed is:

1. A photograph image-processing method, comprising the steps of:
   entering a film image for reading a film image by an image pickup device, generating a plurality of pieces of color image data and storing the generated color image data in a memory;
   generating concentration histograms for each of RGB color components from all of the color image data of one roll of a film which are stored in the memory;
   relative-stretch-processing the concentration histograms in a concentration axial direction;
   calculating and deriving a relative stretch ratio which maximizes a superimposed area of each RGB concentration histogram which has undergone relative-stretch processing;
   calculating and deriving an evaluation value of reliability with respect to the relative stretch ratio;
   calculating and deriving a correction stretch ratio based on the evaluation value;
   conversion processing respective RGB components of each pixel of the color image data in accordance with the correction stretch ratio; and
   exposing photographic printing paper with an exposure head in accordance with the color image data of which RGB components of each pixel are conversion processed to output a photo-print.

2. The photograph image-processing method according to claim 1, wherein the relative-stretch-processing step comprises a base concentration calculation step that calculates and derives a base concentration of a film from the color image data, and
   a stretch processing calculating step that stretches the concentration histograms in the concentration axial direction with the base concentration used as a reference.

3. The photograph image-processing method according to claim 1, wherein the relative-stretch-processing step comprises a shift processing step that shifts concentration histograms of other colors in the concentration axial direction, respectively, with a concentration histogram of a specific color used as a reference, and
   a stretch processing calculating step that stretches the concentration histograms of the other colors in the concentration axial direction with a minimum concentration value used as a reference after shift processing.

4. The photograph image-processing method according to claim 1, wherein the evaluation value is found by fuzzy inference based on respective specified membership functions for a superimposed area ratio which is a ratio of respective numbers of pixels of superimposed portions of concentration histograms of each of generated RGB color components when the superimposed area of each RGB color component is maximized by the relative-stretch processing to total pixels, a number of frame-images in one roll of the film which are contained in the color image data, and image similarity between frame-images expressed by a mean superimposed area ratio of RGB mean concentration histograms for each frame-image data in one roll of the film which is contained in the color image data.

5. The photograph image-processing method according to claim 1, wherein the evaluation value is found by a neural network in which indices are input,
   the indices including:
   a superimposed area ratio which is a ratio of respective numbers of pixels of superimposed portions of concentration histograms of each generated RGB color component when the superimposed area of each RGB color component is maximized by the relative-stretch processing to total pixels, a number of frame-images in one roll of the film which are contained in the color image data, and image similarity between frame-images expressed by the mean superimposed area ratio of RGB mean concentration histograms for each frame-image data in one roll of the film which is contained in the color image data.

6. A photograph image-processing method, comprising the steps of:

entering a film image by reading a film image by an image pickup device, generating a plurality of pieces of color image data and storing the generated color image data in a memory;

generating concentration histograms for each of RGB color components from all of the color image data of one roll of a film which are stored in the memory;

relative-stretch-processing that relatively stretch-process the concentration histograms in a concentration axial direction;

calculating and deriving a relative stretch ratio which maximizes a superimposed area of each RGB concentration histogram which has undergone relative-stretch processing;

calculating and deriving an evaluation value of reliability with respect to the relative stretch ratio;

calculating and deriving a correction stretch ratio based on the evaluation value; and adjusting a photochromic filter included in an analog exposure unit for projecting and exposing a film fixed to a negative mask onto photographic printing paper based on the correction stretch ratio and exposing the film to the photographic printing paper to output a photo-print.

7. The photograph image-processing method according to claim 6, wherein the relative-stretch-processing step comprises a base concentration calculation step that calculates and derives a base concentration of a film from the color image data, and a stretch processing calculating step that stretches the concentration histograms in a concentration axial direction with the base concentration used as a reference.

8. The photograph image-processing method according to claim 6, wherein the relative-stretch-processing step comprises a shift processing step that shifts concentration histograms of other colors in the concentration axial direction, respectively, with a concentration histogram of a specific color used as a reference, and a stretch processing calculating step that stretches the concentration histograms of the other colors in the concentration axial direction with the minimum concentration value used as a reference after shift processing.

9. The photograph image-processing method according to claim 6, wherein the evaluation value is found by fuzzy inference based on respective specified membership functions for a superimposed area ratio which is a ratio of respective numbers of pixels of superimposed portions of concentration histograms of each of generated RGB color components when the superimposed area of each RGB color component is maximized by the relative-stretch processing to total pixels, a number of frame-images in one roll of the film which are contained in the color image data, and image similarity between frame-images expressed by a mean superimposed area ratio of RGB mean concentration histograms for each frame-image data in one roll of the film which is contained in the color image data.

10. The photograph image-processing method according to claim 6, wherein the evaluation value is found by a neural network in which indices are input, the indices includes:

a superimposed area ratio which is a ratio of respective numbers of pixels of superimposed portions of concentration histograms of each generated RGB color component when the superimposed area of each RGB color component is maximized by the relative-stretch processing to total pixels, a number of frame-images in one roll of the film which are contained in the color image data, and image similarity between frame-images expressed by a mean superimposed area ratio of RGB mean concentration histograms for each frame-image data in one roll of the film which is contained in the color image data.

11. A photograph image-processing device, comprising:

a film image entering unit that reads a film image by an image pickup device, generates a plurality of pieces of color image data and stores the generated color image data in a memory;

a concentration histogram generating unit for generating each of RGB color components from all of the color image data of one roll of a film which are stored in the memory;

a relative-stretch-processing unit that relatively stretch-processes the concentration histograms in a concentration axial direction;

a relative stretch ratio calculating unit that calculates and derives a relative stretch ratio which maximizes a superimposed area of each RGB concentration histogram which has undergone relative-stretch processing;

an evaluation value calculating unit that calculates and derives an evaluation value of reliability with respect to the relative stretch ratio;

a correction stretch ratio calculating unit that calculates and derives a correction stretch ratio on the basis of the evaluation value;

a color data conversion-processing unit which conversion-processes respective RGB components of each pixel of the color image data in accordance with the correction stretch ratio; and an output unit that exposes photographic printing paper with an exposure head in accordance with the color image data of which the RGB components of each pixel are conversion-processed to output a photo-print.

12. The photograph image-processing device according to claim 11, wherein the relative-stretch-processing unit comprises a base concentration calculation unit that calculates and derives a base concentration of a film from the color image data, and a stretch processing calculating unit that stretches the concentration histograms in the concentration axial direction with the base concentration used as a reference.

13. The photograph image-processing device according to claim 11, wherein the relative-stretch-processing unit comprises a shift processing unit that shifts concentration histograms of other colors in the concentration axial direction, respectively, with a concentration histogram of a specific color used as a reference, and a stretch processing calculating unit that stretches the concentration histograms of the other colors in the concentration axial direction with the minimum concentration value used as a reference after shift processing.

14. The photograph image-processing device according to claim 11, wherein the evaluation value is found by fuzzy inference based on respective specified membership functions for a superimposed area ratio which is a ratio of respective numbers of pixels of superimposed portions of concentration histograms of each of generated RGB color components when the superimposed area of each RGB color component is maximized by the relative-stretch processing to total pixels,
   a number of frame-images in one roll of the film which are contained in the color image data, and
   image similarity between frame-images expressed by a mean superimposed area ratio of RGB mean concentration histograms for each frame-image data in one roll of the film which is contained in the color image data.

15. The photograph image-processing device according to claim 11, wherein the evaluation value is found by a neural network in which indices are input, the indices includes:
   a superimposed area ratio which is a ratio of respective numbers of pixels of superimposed portions of concentration histograms of each generated RGB color component when the superimposed area of each RGB color component is maximized by the relative-stretch processing to total pixels,
   a number of frame-images in one roll of the film which are contained in the color image data, and
   image similarity between frame-images expressed by a mean superimposed area ratio of RGB mean concentration histograms for each frame-image data in one roll of the film which is contained in the color image data.

16. A photograph image-processing device, comprising:
   a film image entering unit that reads a film image by an image pickup device, generates a plurality of pieces of color image data and stores the generated color image data in a memory;
   a concentration histogram generating unit for generating each of RGB color components from all of the color image data of one roll of a film which are stored in the memory;
   a relative-stretch-processing unit that relatively stretch-processes the concentration histograms in a concentration axial direction;
   a relative stretch ratio calculating unit that calculates and derives a relative stretch ratio which maximizes a superimposed area of each RGB concentration histogram which has undergone relative-stretch processing;
   an evaluation value calculating unit that calculates and derives an evaluation value of reliability with respect to the relative stretch ratio;
   a correction stretch ratio calculating unit that calculates and derives a correction stretch ratio on the basis of the evaluation value; and
   an output unit that adjusts a photochromic filter included in an analog exposure unit for projecting and exposing a film fixed to a negative mask onto photographic printing paper on the basis of the correction stretch ratio and exposes the film to the photographic printing paper to output a photo-print.

17. The photograph image-processing device according to claim 16, wherein the relative-stretch-processing unit comprises a base concentration calculation unit that calculates and derives a base concentration of a film from the color image data, and
   a stretch processing calculating unit that stretches the concentration histograms in the concentration axial direction with the base concentration used as a reference.

18. The photograph image-processing device according to claim 16, wherein the relative-stretch-processing unit comprises a shift processing unit that shifts concentration histograms of other colors in the concentration axial direction, respectively, with a concentration histogram of a specific color used as a reference, and
   a stretch processing calculating unit that stretches the concentration histograms of the other colors in the concentration axial direction with the minimum concentration value used as a reference after shift processing.

19. The photograph image-processing device according to claim 16, wherein the evaluation value is found by fuzzy inference based on respective specified membership functions for a superimposed area ratio which is a ratio of respective numbers of pixels of superimposed portions of concentration histograms of each generated RGB color component when the superimposed area of each RGB color component is maximized by the relative-stretch processing to total pixels,
   a number of frame-images in one roll of the film which are contained in the color image data, and
   image similarity between frame-images expressed by a mean superimposed area ratio of RGB mean concentration histograms for each frame-image data in one roll of the film which is contained in the color image data.

20. The photograph image-processing device according to claim 16, wherein the evaluation value is found by a neural network in which indices are input, the indices including:
   a superimposed area ratio which is a ratio of respective numbers of pixels of superimposed portions of concentration histograms of each generated RGB color component when the superimposed area of each RGB color component is maximized by the relative-stretch processing to total pixels,
   a number of frame-images in one roll of the film which are contained in the color image data, and
   image similarity between frame-images expressed by the mean superimposed area ratio of RGB mean concentration histograms for each frame-image data in one roll of the film which is contained in the color image data.

* * * * *